(12) United States Patent
Suga

(10) Patent No.: US 7,849,308 B2
(45) Date of Patent: Dec. 7, 2010

(54) DATA GENERATING DEVICE AND CONTROL METHOD THEREOF, DATA ANALYZING DEVICE AND CONTROL METHOD THEREOF, DATA PROCESSING SYSTEM, PROGRAM AND MACHINE-READABLE STORAGE MEDIUM

(75) Inventor: Yuji Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 11/736,105

(22) Filed: Apr. 17, 2007

(65) Prior Publication Data

US 2008/0046722 A1 Feb. 21, 2008

(30) Foreign Application Priority Data

Apr. 18, 2006 (JP) ............................ 2006-115013
Mar. 12, 2007 (JP) ............................ 2007-062483

(51) Int. Cl.
  *H04L 29/06* (2006.01)
(52) U.S. Cl. ..................................................... 713/157
(58) Field of Classification Search .................. 713/157
  See application file for complete search history.

(56) References Cited

U.S. PATENT DOCUMENTS

| 2002/0073311 | A1* | 6/2002 | Futamura et al. ............. 713/157 |
| 2002/0169842 | A1 | 11/2002 | Christensen et al. |
| 2003/0072059 | A1* | 4/2003 | Thomas et al. .............. 359/167 |
| 2003/0211842 | A1* | 11/2003 | Kempf et al. ............... 455/411 |
| 2004/0193876 | A1* | 9/2004 | Donley et al. ............... 713/162 |
| 2004/0215803 | A1 | 10/2004 | Yamada |
| 2008/0046722 | A1* | 2/2008 | Suga .......................... 713/157 |

FOREIGN PATENT DOCUMENTS

KR 2004-0094601 A 11/2004

OTHER PUBLICATIONS

R.L. Rivest, A. Shamir and L. Adleman: "A Method for Obtaining Digital Signatures and Public-Key Cryptosystems", Communications of the ACM, v. 21, n. 2, pp. 120-126, Feb. 1978.
Federal Information Processing Standards (FIPS) 186-2, Digital Signature Standard (DSS), Jan. 2000.
ITU-T Recommendation X.509/ISO/IEC 9594-8: "Information Technology—Open Systems Interconnection—The Directory: Public-key and attribute certificate frameworks", May 2001.
C. Ellison, SPKI Certificate Theory, Request for Comments 2693, IETF, Sep. 1999.
XML Key Management Specification (XKMS 2.0), http://www.w3.org/TR/xkms2/, W3C Candidate Recommendation Apr. 5, 2004.

* cited by examiner

*Primary Examiner*—Kambiz Zand
*Assistant Examiner*—Jason K Gee
(74) *Attorney, Agent, or Firm*—Canon USA, Inc. IP Division

(57) ABSTRACT

A data generating device comprises a variable-length data input unit adapted to input variable-length data, an embedding unit adapted to embed identification data corresponding to format information indicating the format of the variable-length data to the variable-length data; an location information acquiring unit adapted to acquire location information showing locations corresponding to identification data in variable-length data; and an outputting unit adapted to output the variable-length data in which the identification data is embedded and the location information, wherein the variable-length data comprises a public key certificate.

7 Claims, 11 Drawing Sheets

DATA GENERATING DEVICE AND CONTROL METHOD THEREOF, DATA ANALYZING DEVICE AND CONTROL METHOD THEREOF, DATA PROCESSING SYSTEM, PROGRAM AND MACHINE-READABLE STORAGE MEDIUM

BACKGROUND OF THE INVENTION

1. Field of the Invention

The present invention relates to data generating device and control method thereof, data analyzing device and control method thereof, data processing system, program and machine-readable storage medium. Particularly, the present invention relates to technology for efficiently analyzing variable-length data, in particular technology for efficiently analyzing public key certificates.

2. Description of the Related Art

As digital data including text data and image data flows through wide-area networks such as the internet, there is a danger that the data might be altered by a third party, since digital data is easily modified. In light of this danger, a technology known as a digital signature is known as a method of authenticating data for preventing alteration, making it possible for a recipient to detect whether or not received data has been altered. Digital signature technology also has functionality for preventing spoofing, repudiation, and the like, on the internet, and not just data alteration.

<<Digital Signatures>>

FIG. 10 is a schematic drawing showing a signature creation process and a signature authentication process. An overview of digital signature technology is given with reference to this drawing. Hash functions and public key encryption are used in generating digital signature data. Hereafter, a private key shall be Ks2106, and a public key shall be Kp2111.

When generating a digital signature, a hash process 2102 is applied to entered data (message) M2101, and a digest H(M) (2103), which is fixed-length data, is calculated. The hash function described below is used in the hash process 2102. Next, a conversion process 2104 is applied to this fixed-length data H(M) using the private key Ks2106, thereby creating digital signature data S (2105). The sender of the data sends the digital signature data S (2105) and the entered data (M2101) to the recipient after these processes.

During an authentication process 2112, the recipient first applies a conversion (decryption) process to the digital signature data S (2110) with the public key Kp2111 and acquires the data acquired thereby. Next, whether or not that data matches the data 2109 acquired by applying the hash process 2108 to the entered data M2107 is authenticated. As a result (2113) of this authentication, if the two sets of data do not match, it is judged that the data M has been altered, and if the two sets of data do match, it is judged that no alteration has been done. The recipient can thus detect the presence of alterations.

Moreover, digital signature methods include known RSA and DSA (described in detail below) and other methods based on public key encryption. The security of these digital signatures lies in the difficulty arising out of the computational complexity of forging a signature or cryptanalyzing a private key for an entity other than the possessor of the private key.

(Hash Functions)

Hash functions are described next. Hash functions are used together with the digital signature process in digital signature methods to reduce the volume of data to be computed through irreversible compression of the signed data, and thereby reduce the amount of time for the signature appending process. The hash function has functionality for applying a process to the entered data M with an arbitrary length and generating output data H(M) with a fixed length. In this case, the output H(M) is called the hash data of clear text data M.

In particular, one-way hash functions are characterized in that, when data M is received, the calculation of a clear text data M' in which H(M')=H(M) is difficult in terms of computational complexity. MD2, MD5, SHA-1, and other standard algorithms are known as such one-way hash functions.

(Public Key Encryption)

Public key encryption is described next. Public key encryption is characterized by using two corresponding keys, data encrypted with one key being impossible to decrypt with the other key. One of these two keys is called the public key, and is used disclosed to the outside. The other key is called the private key, and it is kept confidential and only used by the owner.

RSA signatures, DSA signatures, Schnorr signatures, and others are known as digital signatures used in public key encryption methods. The RSA signature disclosed in R. L. Rivest, A. Shamir and L. Adleman: "A Method for Obtaining Digital Signatures and Public-Key Cryptosystems", Communications of the ACM, v. 21, n. 2, pp. 120-126, February 1978, and the DSA signature disclosed in Federal Information Processing Standards (FIPS) 186-2, Digital Signature Standard (DSS), January 2000 are described as examples.

(RSA Signatures)

Generate primes p and q and let n=pq. Let $\lambda(n)$ be the least common multiple of p−1 and q−1. Select an appropriate element e co-prime with $\lambda(n)$, and let d=1/e(mod $\lambda(n)$). The public key is e and n, and the private key is d. Let H( ) be the hash function.

[Creation of RSA Signature] Signature Creation Procedure for Document M

Let $s := H(M)^d \pmod{n}$ be the signature data.

[Verification of RSA Signature] Verification Procedure for Signature (s,T) Related to Document M.

Verify whether or not $H(M)=s^e \pmod{n}$ is true. If it is true, then determine that no alteration has taken place. If it is not true, then determine that alteration has taken place.

(DSA Signatures)

Let p and q be primes and let p−1 divide q. Let g be the origin (generator) for order q, arbitrarily selected from $Z_p^*$ (the multiplicative group wherein 0 is omitted from the cyclic group $Z_p$ of order p). Let x selected arbitrarily from $Z_p^*$ be the private key, and let $y := g^x \pmod{p}$ be the corresponding public key y. Let H( ) be the hash function.

[Creation of DSA Signature] Signature Creation Procedure for Document M

1) Select $\alpha$ from $Z_q$ arbitrarily and let $T := (g^\alpha \bmod p) \bmod q$.
2) Let c:=H(M).
3) Let $s := \alpha^{-1}(c+xT) \bmod q$, and (s,T) be the signature data.

[Verification of DSA Signature] Verification Procedure for Signature (s,T) Related to Document M.

Verify whether $T = (g^{h(M)s^{-1}} y^{Ts^{-1}} \bmod p) \bmod q$ is true. If it is true, then determine that no alteration has taken place. If it is not true, then determine that alteration has taken place.

<<Public Key Authentication Infrastructure>>

In client-server communication, user authentication is often needed when a client accesses server resources. A well-known technology used in user authentication is public key certificates such as ITU-T Recommendation X.509 and the like (ITU-T Recommendation X.509/ISO/IEC 9594-8: "Information technology—Open Systems Interconnection—The Directory: Public-key and attribute certificate frameworks"). A public key certificate is data guaranteeing that a public key corresponds to the user thereof, and to which is applied a digital signature by a trustworthy third-party known as a certification authority. For example, user authentication using SSL (Secure Sockets Layer) implemented by a browser is performed based on verifying whether or not the user has the private key corresponding to the public key contained in the public key certificate presented by the user.

By having signatures from certification authorities, public key certificates can be trusted as regards information pertaining to public keys of users and servers contained in the public key certificate. In other words, the trustworthiness of the information contained in the public key certificates is founded on the security of the digital signatures by the certification authorities. For this reason, if the private key used in creating the signature of a certification authority was leaked or became compromised, all the public key certificates issued by that certification authority would lose their trustworthiness and become invalid.

ITU-T Recommendation X.509 v.3, which is an example of a public key certificate, contains the ID and public key information of the certified entity (subject) as signed data by the certification authority The signature data of the certification authority is generated by computing the signature using, for example, the RSA algorithm described above on a digest in which a hash function has been applied to the signed data. Moreover, the signed data is provided with optional fields known as extensions, making it possible to include unique and new extension data in the application or protocol.

(X.509 v.3 Format)

FIG. 11 is a view showing a typical format of a public key certificate defined in X.509 v.3. The information stored in each field is described below.

A version 2201 stores the version of X.509. This field is optional, and if omitted expresses v1. A serialNumber 2202 stores a serial number uniquely allocated to this public key certificate by a certifying authority. A signature 2203 stores the signature method of the public key certificate. An issuer 2204 stores the X.500 identification name of the certifying authority which is the issuer of the public key certificate. A validity 2205 stores the expiration date of the public key (starting date and time and ending date and time). A subject 2206 stores the X.500 identification name of the owner of the private key corresponding to the public key contained in the certificate. A subjectPublicKeyInfo 2207 stores the public key which is certified.

An issuerUniqueIdentifier 2208 and a subjectUniqueIdentifier 2209 are optional fields added in v2. These store the unique identifier of the certifying authority and the unique identifier of the owner.

An extensions field 2210 is an optional field added in v3. These contain a three-part group made up of an extension identifier (extnId) 2211, an extension value (extnValue) 2213, and a critical bit (critical) 2212. The v3 extensions field 2210 may include not only the standard extension set forth in X.509, but also unique and new extensions. For this reason, how to authenticate the v3 extensions depends on the application. Moreover, the critical bit 2212 expresses whether these extensions are required or can be ignored.

The certifying authority generates a signature 2214 using the private key of the certifying authority on the data constituting the above public key certificate, and appends this to the public key certificate. The user of the public key certificate can use the signature 2214 to verify the legitimacy of the public key certificate.

(Analysis of the Public Key Certificate)

Use of the digital signature technology described above has the effect of preventing spoofing, data alteration, repudiation, and so on, on the internet. The infrastructure is in place for public key certificates to circulate as an infrastructure of trust having this effect. This infrastructure of trust is being used in more varied devices in recent years, even being used in digital home appliances, portable telephones, PDAs, and more, in addition to PCs and servers. The computational cost required for analyzing public key certificates therefore needs to be small enough for portable terminals, for example, to be able to compute them.

However, the X.509 public key certificate used as the de facto standard format for public key certificates is written in ASN.1, a general descriptive notation for variable-length data, and DER, the encoding method thereof (ISO/IEC 8825-1:1995 Specification of Basic Encoding Rules (BER), Canonical Encoding Rules (CER), and Distinguished Encoding Rules (DER)). Therefore, devices which analyze public key certificates have had not only to execute processes for decryption computation but also for parsing ASN.1, or in other words analyzing the DER encoding method which is variable-length data, which required a certain level of computational cost. In other words, in order to use the infrastructure of trust afforded by X.509 public key certificates, devices have had to analyze variable-length data, which has entailed computational cost.

In light of this situation, constitutions have been known whose purpose is to allow use of the public key infrastructure without having to parse ASN.1 data and other types of variable-length data. Such constitutions can be broadly divided into two methods.

(1) The first is a method for reducing the computational cost involved in verification processes by using light public key certificates, such as SPKI (C. Ellison, SPKI Certificate Theory, Request for Comments 2693, IETF, September 1999). When reading SPKI, there is no need to parse ASN.1, and neither is there as much information as X.509, which means that it can be used easily in digital home appliances and portable telephones, etc., with a low amount of CPU resources.

(2) The other is a method in which devices for which executing a parse process for ASN.1 is difficult entrust processing to the authority, which performs the signature verification, signature appending, and other processes as a proxy. One known example of this is XKMS (XML Key Management Specification (XKMS 2.0), http://www.w3.org/TR/xkms2/, W3C Candidate Recommendation 5 Apr. 2004).

However, the domains which can be authenticated with method (1) are limited, and there is no compatibility with X.509. It is therefore difficult to establish interoperability with the certification infrastructure already popular on the internet.

Moreover, with method (2), communication between the authority (server) and device must be done in a trusted manner. This means that a separate mechanism, such as a prescribed authentication method, must be provided in order to perform secure communication between the server and the device. Furthermore, in order to use XKMS, the XML must also be parsed separately.

The above problems are not limited to analysis of public key certificates. In other words, conventional constitutions have been incapable of low computational cost analysis of all kinds of variable-length data described using existing variable-length data formats, including public key certificates.

SUMMARY OF THE INVENTION

The present invention has been devised in light of these problems, and provides a technology for making low computational cost analysis possible of variable-length data described using existing variable-length data formats.

In order to achieve this, the present invention in its one aspect provides a data generating device comprises:

a variable-length data input unit adapted to input variable-length data;

an embedding unit adapted to embed identification data corresponding to format information indicating the format of the variable-length data to the variable-length data;

an location information acquiring unit adapted to acquire location information showing locations corresponding to identification data in variable-length data; and an outputting unit adapted to output the variable-length data in which the identification data is embedded and the location information, wherein the variable-length data comprises a public key certificate.

The present invention in its another aspect provides a data analyzing device comprises:

an input unit adapted to input data to be analyzed which is variable-length data and which includes identification data;

a storage unit adapted to store the identification data and associated format information indicating a format of the data;

a detection unit adapted to detect the identification data in the data to be analyzed; and an analysis unit adapted to analyze the data to be analyzed based on the format information associated with the identification data.

The present invention in its still another aspect provides a control method for a data generating device comprises:

a variable-length data input step of inputting variable-length data;

an embedding step of embedding identification data corresponding to format information indicating a format of the input variable-length data to the variable-length data;

an location information acquiring step of acquiring location information indicating locations corresponding to the identification data in the variable-length data; and an outputting step of outputting the variable-length data in which the identification data is embedded and the location information;

wherein the variable-length data comprises information constituting a public key certificate.

The present invention in its yet another aspect provides a control method for a data analyzing device comprising a storage unit adapted to store identification data and associated format information indicating a format of the data, the method comprises:

an input step of inputting data to be analyzed which is variable-length data and which includes identification data;

a detection step of detecting identification data in the data to be analyzed; and an analysis step of analyzing the data to be analyzed based on the format information associated with the identification data.

The present invention in its still yet another aspect provides a data processing system having a data generating device and a data analyzing device, the data generating device comprises:

a variable-length data input unit adapted to input variable-length data;

an embedding unit adapted to embed identification data corresponding to format information indicating a format of the variable-length data to the variable-length data;

an location information acquiring unit adapted to acquire location information showing locations corresponding to identification data in variable-length data in which the identification data has been embedded; and an outputting unit adapted to output the variable-length data in which the identification data is embedded and the location information;

the data analyzing device comprises:

an acquisition unit adapted to acquire as data to be analyzed variable-length data in which is embedded the identification data;

a storage unit adapted to store in association identification data and format information indicating a format of data;

a detection unit adapted to detect the identification data in the data to be analyzed; and an analysis unit adapted to analyze the data to be analyzed based on the format information associated with the identification data.

Further features of the present invention will become apparent from the following description of exemplary embodiments (with reference to the attached drawings).

DESCRIPTION OF THE EMBODIMENTS

The embodiments of the present invention are described in detail below with reference to the appended drawings. Note, however, that the constitutional elements described in these embodiments are merely an illustration, and do not limit the scope of the present invention to these constitutional elements.

First Embodiment

In the present embodiment there exist a data processing device for generating variable-length data (hereafter called a variable-length data generating device) and a data processing device for analyzing generated variable-length data (hereafter called a variable-length data analyzing device). The variable-length data generating device and the variable-length data analyzing device agree ahead of time on the corresponding relationship between the formats and identifiers of variable-length data being handled. For example, information (format)

on what kind of data is stored in a certain bit location in the variable-length data and the identifier corresponding thereto are shared ahead of time.

In this situation, the variable-length data generating device inputs variable-length data and adds to the variable-length data an identifier corresponding to the format of the input variable-length data. The identifier is used as information indicating that the variable-length data can be analyzed as fixed-length data of the corresponding format.

At the same time, the variable-length data analyzing device accepts the variable-length data to be analyzed and verifies whether an identifier is contained in the received variable-length data. If an identifier is contained, then the variable-length data analyzing device determines that the data is arranged in a manner conformant with the format corresponding to the identifier, analyzes the variable-length data using the same procedure as the process performed on fixed-length data, and performs the prescribed processes.

Thus, with the constitution according to the present embodiment, if an identifier is successfully detected during data analysis, variable-length data can be analyzed at a low cost without parsing variable-length data. Moreover, the variable-length data generating device and the variable-length data analyzing device may be realized in the same data processing device in accordance with the purpose and situation.

Figure 1:
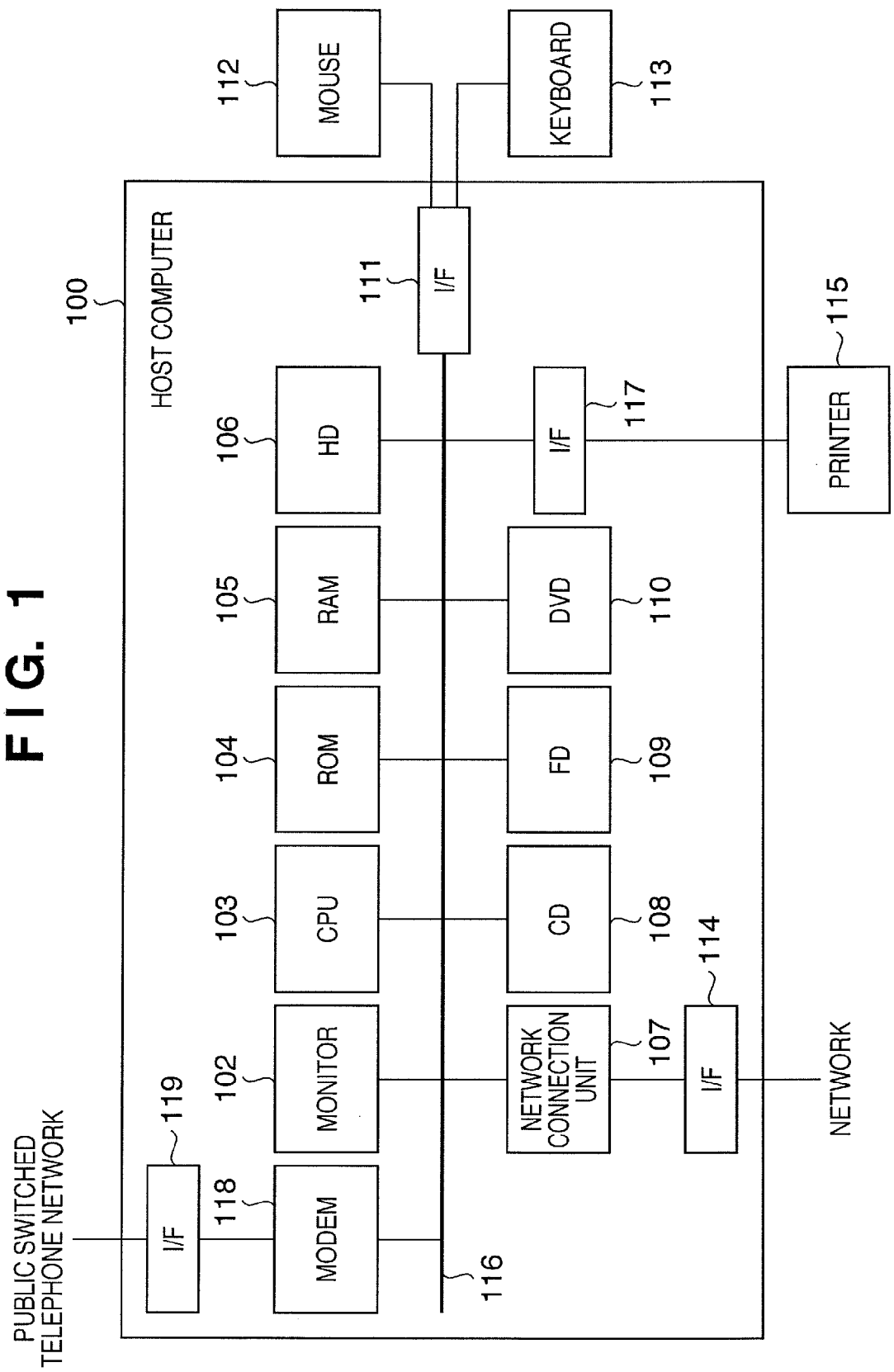
FIG. 1 is a block diagram showing a hardware constitution of a data processing device.

FIG. 1 is a block diagram showing a hardware constitution of the data processing device according to the present embodiment. The data processing device according to the present embodiment is, for example, realized in a personal computer (PC), workstation (WS), personal digital assistant (PDA), or the like. Moreover, the data processing device need not necessarily comprise all the functions shown in FIG. 1 in the embodiment of the present invention.

(Constitution of the Data Processing Device)

As shown in FIG. 1, a data processing device (host computer) 100 is constituted by mutually communicably connecting a monitor 102, a CPU 103, a ROM 104, a RAM 105, and so on via a bus 116.

In FIG. 1, a mouse 112 and a keyboard 113 are operating units for a user to input commands and the like to the data processing device 100. The information (operation information) input via these operation units is read into the data processing device 100 via an interface 111.

The various types of information in the data processing device 100 (character information, image information, etc.) is such that they can be printed by a printer 115. The printer 115 is connected to the data processing device 100 via an interface 117.

The monitor 102, as a display unit, displays command information to the user as well as various types of information such as character information, image information, and the like.

The CPU 103 manages overall operation control of the data processing device 100, controlling the entire data processing device 100 by reading and executing processing programs (software programs) from a hard disk 106 or the like. In particular, in the embodiments of the present invention, the CPU 103 reads from the hard disk 106 or the like into the RAM 105 and executes processing programs for realizing data generation and analysis, thereby applying information processes described below. Note that the aspect of reading programs is not limited to this, and may be constituted, for example, by causing programs and related data according to the present embodiment to be loaded directly into the RAM 105 and executed from compact disks, floppy disks, DVDs, or other media. Alternately, a constitution is also possible in which programs according to the present embodiment are recorded in the ROM 104 so as to form a part of a memory map, being executed directly by the CPU 103.

The ROM 104 is a read-only memory for storing various types of data such as signature processing programs and key data used in those programs. The RAM 105 is a writeable memory used as, for example, a work area for temporarily storing processing programs and information to be processed, for various processes in the CPU 103.

A large-capacity storage device, such as for example a hard disk 106, saves various types of data and processing programs such as for example information conversion processes transferred to the RAM 105 when executing various processes.

A CD (CD drive) 108 has functionality for reading data stored on a CD (CD-R) as an example of an external storage medium and for writing this to the CD.

Like the CD 108, an FD (floppy disk drive) 109 reads data stored on an FD (floppy disk) as an example of an external storage medium. It also has functionality for writing various types of data to the FD.

A DVD (digital video disk or digital versatile disk) 110 is, like the CD 108 and the FD 109, an example of an external storage medium. The DVD 110 has functionality for reading data stored on DVDs and writing data to DVDs.

In cases in which, for example, programs for editing or printer drivers are stored on external storage media such as CDs, FDs, or DVDs, a configuration is possible in which these programs are installed on the hard disk 106 and transferred to the RAM 105 as needed.

The interface 111 is for accepting input from the user via the mouse 112 or the keyboard 113. A modem 118 is a communication modem, connected to an external network through, for example, a public switched telephone network via an interface 119. A network connection unit 107 is connected to an external network via an interface 114.

Moreover, an embodiment is also possible substituting the hardware devices with software for realizing the same functionality as the above devices.

In the present embodiment for the sake of ease of description, a configuration is described in which the data processing device is realized in a single device, but it may also be realized in a configuration in which resources are distributed to a plurality of devices. For example, storage and computing resources may be constituted in a manner distributed to a plurality of devices. Alternately, resources may be distributed to individual constitutional elements virtually realized in the data processing device, performing parallel processing.

(Variable-Length Data Generating Process)

Figure 2:
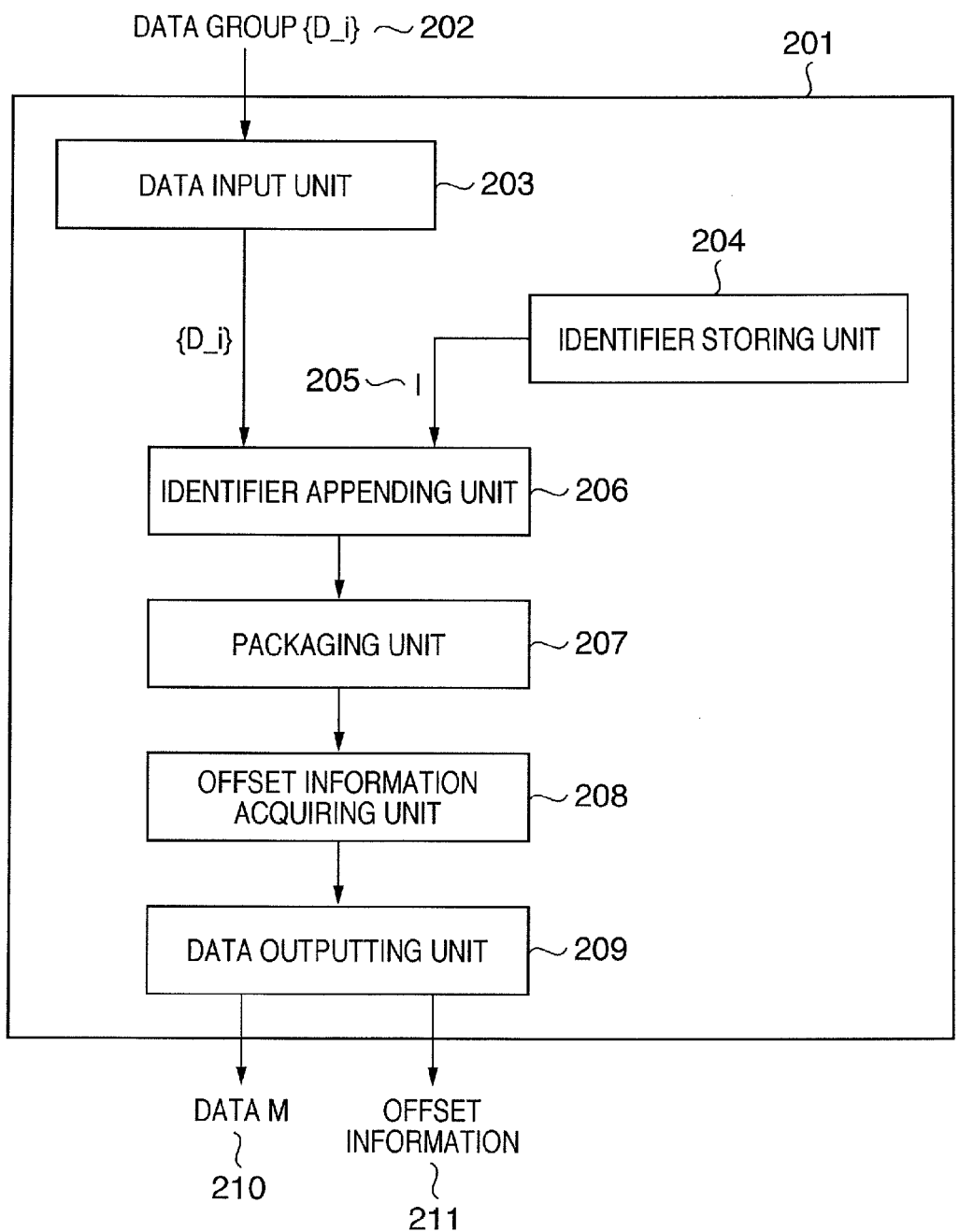
FIG. 2 is a block diagram showing a functional constitution in generating variable-length data.

Next, a variable-length data generating process using the variable-length data generating device (the data processing device 100 performing variable-length data a variable-length data generating process) is described with reference to FIG. 2. FIG. 2 is a block diagram showing a functional constitution in generating variable-length data.

The functional blocks shown in FIG. 2 execute programs loaded into the RAM 105 by the CPU 103 of the data processing device described above with reference to FIG. 1, and are realized by working together with the hardware shown in FIG. 1. Of course, all or part of the functional blocks may be realized with specialized hardware.

The variable-length data generating device 201 inputs a data group {D_i} 202 comprising variable-length data, and generates variable-length data M210 containing information (identifier) indicating that the data can be processed as fixed-length data.

In FIG. 2, 203 is a data input unit 203 for inputting the data group {D_i} 202. The data group {D_i} 202 is a collection of data constituting the variable-length data M210 which is the output from the variable-length data generating device 201. For example, when generating a public key certificate, which is variable-length data, with the variable-length data generating device 201, the collection of information including public key data, a public key expiration date, identification data of the certifying authority, etc., is input into the data input unit 203 as the data group {D_i} 202.

The variable-length data generating device 201 is further provided with an identifier storing unit 204, an identifier appending unit 206, a packaging unit 207, an offset information acquiring unit 208, and a data outputting unit 209. The identifier storing unit 204 associates an identifier I205 with information relating to the format of variable-length data being handled, and stores and saves this in a prescribed storage device. Here, the identifier I205 is information indicating that the output M210 of the variable-length data generating device 201 may be processed as fixed-length data based on the format information of the corresponding format, and may be constituted as a prescribed bit string. Further, the information on the format is information such as what data is stored in a certain bit location in the variable-length data, and may be constituted, for example, by information defining a starting bit location for each type of data.

The identifier appending unit 206 generates the variable-length data based on the data group {D_i} 202, and adds to the variable-length data the identifier I205 corresponding to the format of the generated variable-length data. The packaging unit 207 packages the data group {D_i} 202 which constitutes the variable-length data and the identifier I205. Here, the packaging process is a process of combining a plurality of sets of data into a single set of data, one example being DER encoding. DER (Distinguished Encoding Rules) is a method of expressing as binary data a template defined in the ASN.1 (Abstract Syntax Notation One) language for defining data structures. ASN.1 is standardized under ISO 8824 and can describe a set of {data type, data} hierarchically. By performing DER encoding, it is possible to express a three-part group including {data type, data length, data} as a single set of binary data, these being hierarchically constituted and uniquely expressible in binary format. DER encoding is a method for binary conversion based on DER rules, and is used for internet communication protocols and data formats. An offset information acquiring unit 208 acquires offset information (location information) related to the position of the identifier I205 in the variable-length data M210 as output data. A data outputting unit 209 outputs the variable-length data M210 which is the output result (variable-length data) from the variable-length data generating device 201 and offset information 211. Note that here an example is given of outputting the offset information 211 from the data outputting unit 209, but the offset information 211 may instead be stored by the storing unit in the variable-length data generating device.

Figure 3:
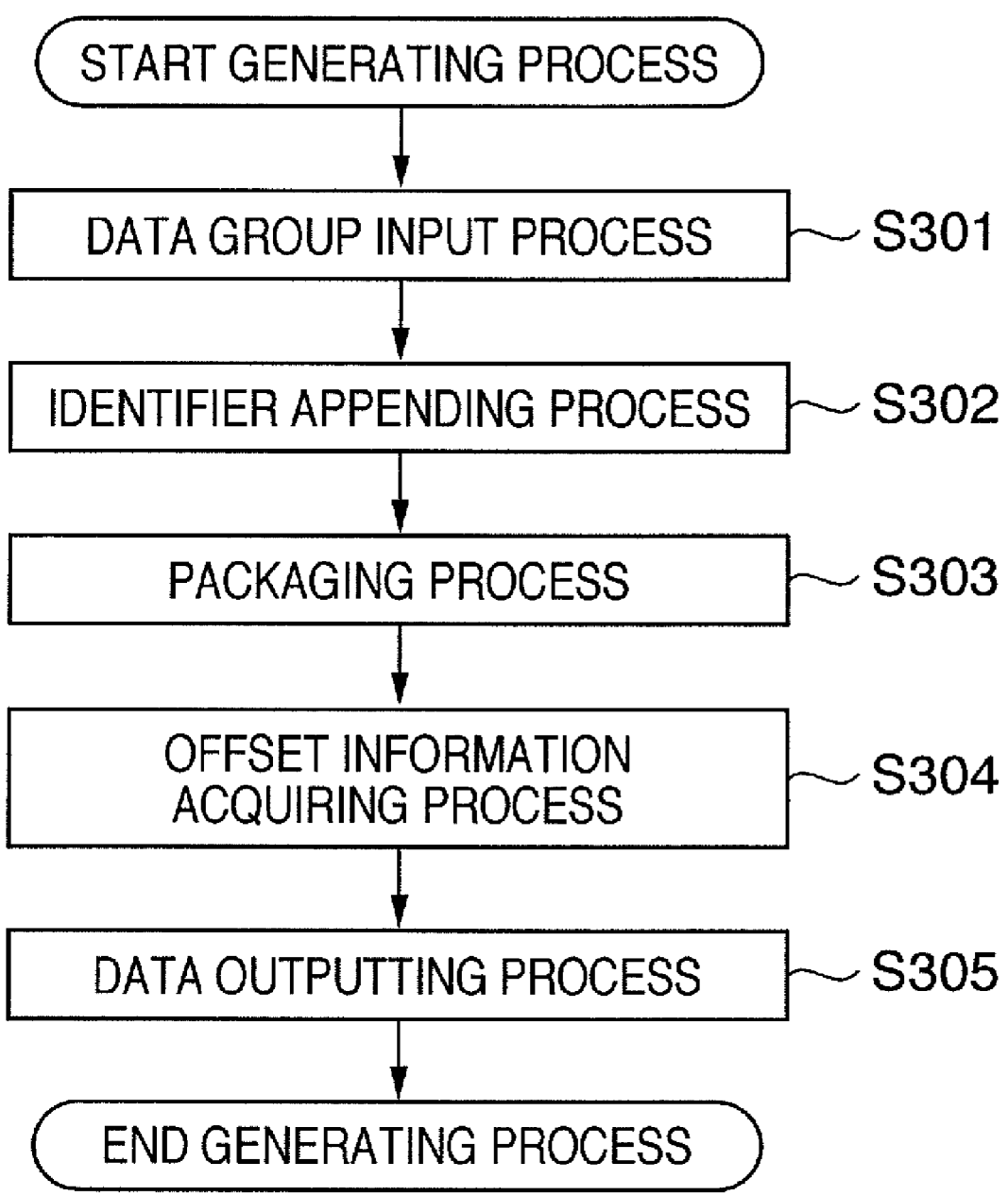
FIG. 3 is a flow-chart showing a flow of a variable-length data generating process.

Next, the variable-length data generating process executed by the variable-length data generating device 201 is described with reference to FIG. 3. FIG. 3 is a flow-chart showing a flow of a variable-length data generating process.

First, in step S301, the data group {D_i} 202 which constitutes the variable-length data is input.

In step S302, the format of the variable-length data input in step S301 is determined, and an identifier I205 corresponding to this format is extracted from the identifier storing unit 204.

Next, in step S303, the packaging process is performed on the data group {D_i} 202 which constitutes the variable-length data and the identifier I205 in step S302.

Next, in step S304, the offset information related to the position of the identifier I205 in the variable-length data M210 is acquired as output data. For example, the starting byte location n and the byte length m of the identifier I205 in the variable-length data M210 is acquired as the offset information. In step S305, the variable-length data M210 and the offset information is output. Here, an example is given of the offset information being output as data different from the variable-length data M210, but it may also be information separately added to the variable-length data M210 or having a fixed value in the variable-length data generating device or systems including this.

As described below, the variable-length data M210 is analyzed as fixed-length data based on the format information of the format corresponding to the identifier I205 when the identifier I205 is included. Details of a process for determining whether or not the output M can be processed as fixed-length data is given in the description of a variable-length data analyzing process below.

(Variable-Length Data Analyzing Process)

Figure 4:
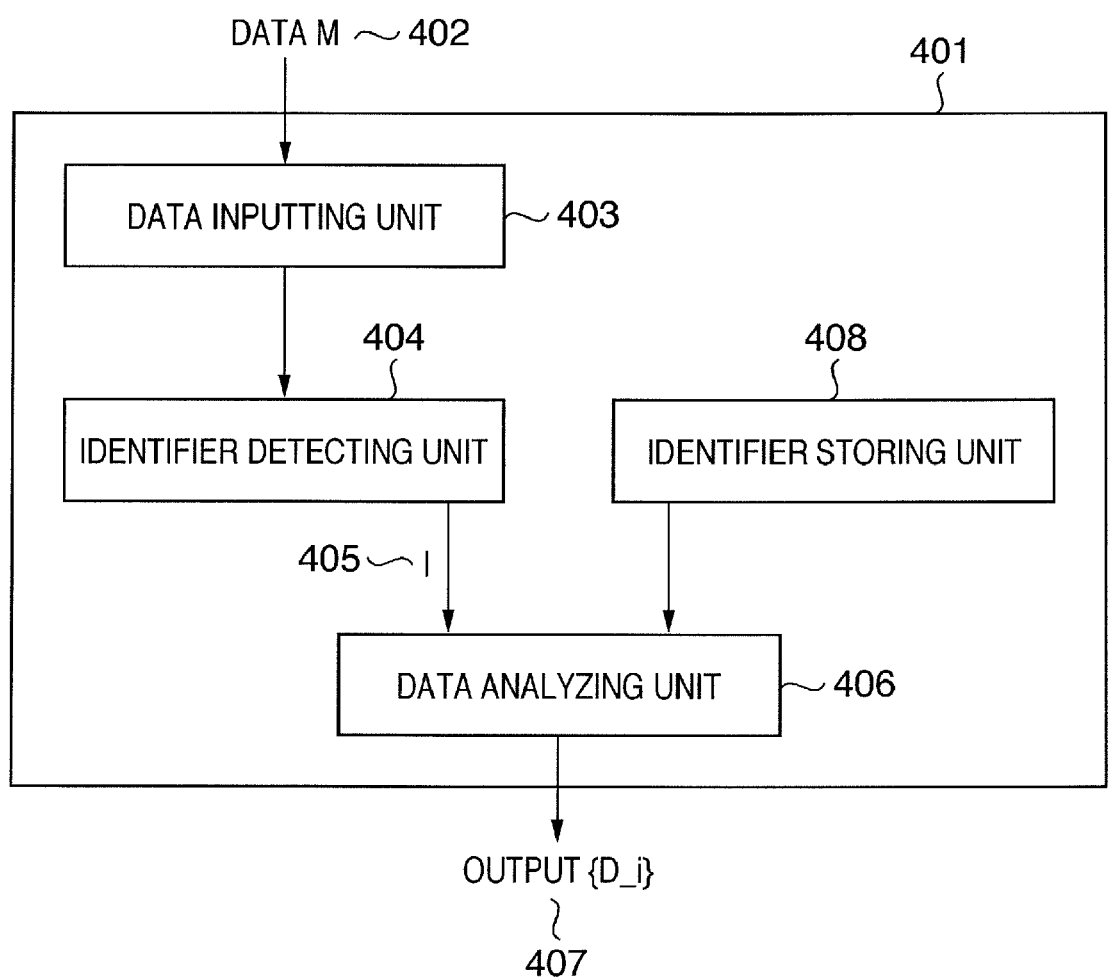
FIG. 4 is a block diagram showing a functional constitution of a variable-length data analyzing device.

Next, a variable-length data analyzing process for analyzing variable-length data generated by the variable-length data generating process described above is described with reference to FIG. 4. FIG. 4 is a block diagram showing the functional configuration of a variable-length data analyzing device.

The functional blocks shown in FIG. 4 are programs loaded into the RAM 105 by the CPU 103 of the data processing device described above with reference to FIG. 1, and are realized by executing the programs working together with the hardware shown in FIG. 1. Of course, all or part of the functional blocks may be realized with specialized hardware.

The variable-length data analyzing device 401 inputs variable-length data M402 and offset information, performs an analyzing process, and outputs a data group {D_i} 407 constituting variable-length data M402.

In FIG. 4, 403 is a data inputting unit for inputting the variable-length data M402 and the offset information. The variable-length data M402 is data generated by the variable-length data generating process described above.

The variable-length data analyzing device 401 is further provided with an identifier detecting unit 404, a data analyzing unit 406, and an identifier storing unit 408. The identifier detecting unit 404 detects whether or not the variable-length data M input into the data inputting unit 403 includes the identifier I405, and, if so, acquires the identifier I405. The acquired identifier I405 is passed to the data analyzing unit 406. The data analyzing unit 406 performs a process described below, and then outputs the data group {D_i} 407 included in the variable-length data M. Like the identifier storing unit 204, the identifier storing unit 408 associates the identifier I405 with information relating to the format of corresponding variable-length data, and stores and saves this in a prescribed storage device.

Figure 5:
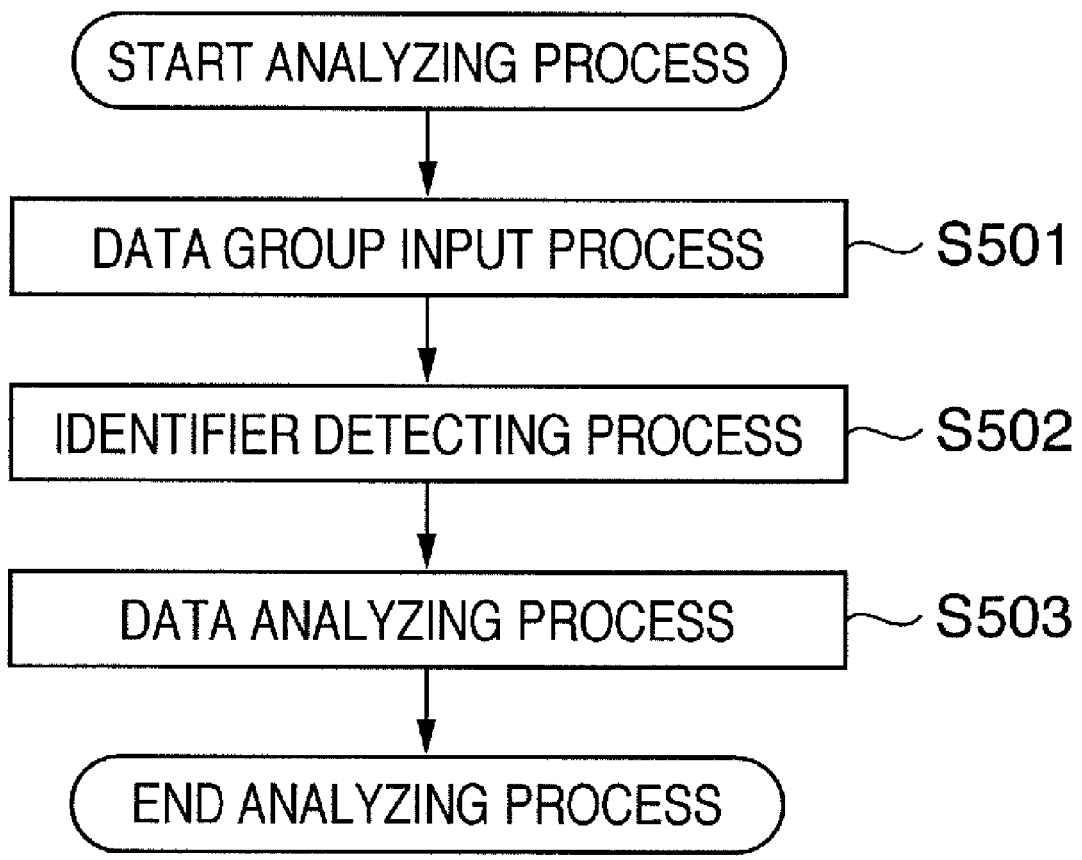
FIG. 5 is a flow-chart showing a flow of a variable-length data analysis process.

Next, the variable-length data analyzing process is described with reference to FIG. 5. FIG. 5 is a flow-chart showing the flow of a variable-length data analysis process.

First, in step S501, data to be analyzed M402 is input. Next, in step S502, a process for detecting and acquiring an identifier I405 from the input data M402 is performed. This process is described in detail below. Next, since the identifier I405 was detected in step S502, in step S503 the data to be analyzed M402 is determined to be arranged so as to conform with the format corresponding to the detected identifier I405. In other words, the identifier storing unit 408 is searched using the detected identifier I405 as a search key, and the format information corresponding to the identifier I405 is extracted. The variable-length data is analyzed in the same procedure as in the process for fixed-length data having the extracted format.

The data group {D_i} stored in data M402 is acquired, and output as an output result. For example, if the variable-length data to be analyzed M402 is a public key certificate, information such as the public key data, the expiration data of the public key, the identification data of the certifying authority, and so on are acquired and output. The variable-length data analyzing process is then finished.

(Identifier Detecting Process)

Figure 6:
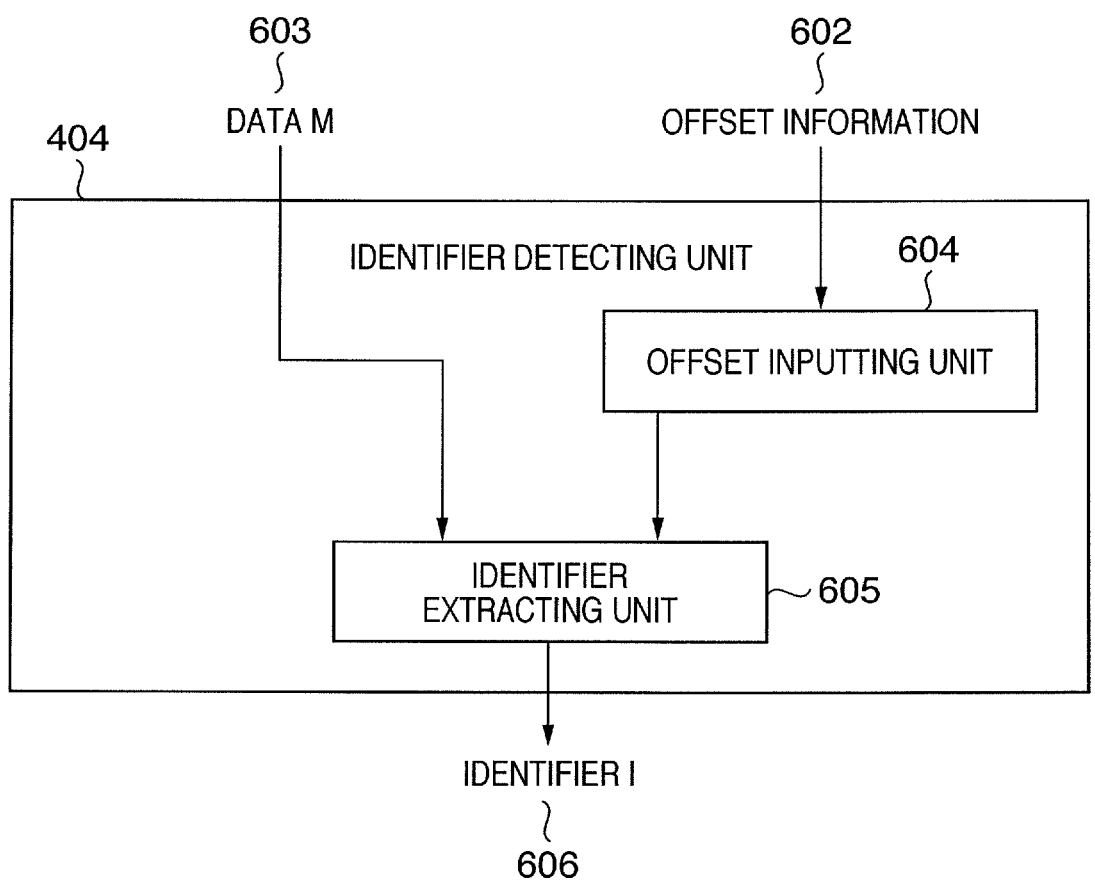
FIG. 6 is a block diagram showing a functional constitution of an identifier detecting unit.

An example of a process in which the identifier detecting unit 404 detects the identifier I606 is described below with reference to FIG. 6. FIG. 6 is a block diagram showing a functional configuration of the identifier detecting unit 404 for detecting an identifier I606 from variable-length data M603 using offset information 602. The identifier detecting unit 404 has an offset inputting unit 604 for inputting offset information determined by the location of the identifier in data to be analyzed M603 and an identifier extracting unit 605 for inputting the data to be analyzed M603, and outputs an identifier I606 as an output result. In order to simply the description, the offset data 602 is below assumed to be integer data n, m signifying the starting byte position n and the byte length m as described above.

The identifier extracting unit 605 reads m bytes starting at the n-th byte from the start of the data to be analyzed M603 (integer data n and data m are given in offset information 602) and extracts the identifier I. The extracted identifier I606 is passed to the data analyzing unit 406 and subjected to a fixed-length data analyzing process based on the detection of the identifier I. The analyzing process by the data analyzing unit 406 can analyze the data not as variable-length data, but as fixed-length data.

As described above, with the configuration according to the present embodiment, agreement is made ahead of time on formats of variable-length data treated as fixed-length data, and when analyzing variable-length data, if an identifier is contained in the variable-length data, the data is processed based on the format corresponding to that identifier. It is therefore possible to analyzing variable-length data as fixed-length data, reducing the computation cost required for analyzing variable-length data, and making efficient analysis possible.

Additionally, the offset information indicating the location occupied by the identifier in the variable-length data is the starting bit position and data length of the location occupied by the identifier in the present embodiment, but this is not a limitation. For example, it is possible to use only one or the other of the starting bit location and data length, or to use the starting bit location and ending bit location. Alternately, a constitution so as to append the location allocated to the identifier to the beginning or end of the variable-length data makes it possible to detect the presence or absence of the identifier I without using offset information.

Second Embodiment

In the first embodiment, the position of the identifier to be extracted is detected by providing the identifier detecting unit of the variable-length data analyzing device with an identifier extracting unit using a data offset. However, if correct offset information which accords with the data to be analyzed is not given, a situation in which analysis is impossible following the correct analysis procedure (processing impossible) might arise, or a situation in which the analyzing process is performed with the wrong data format as though the data were correct (mistaken detection) might arise. Cases in which the identifier contained in the data M402 is not stored in the identifier storing unit 408 are the same. However, the offset information, as described above, contains, for example, the starting location n and the data length m, etc., in the variable-length data of the identifier I. In the present embodiment, an arrangement is described in which mistaken operation is not performed even in cases in which the identifier I cannot be extracted correctly. Further, as the arrangement according to the present embodiment is mostly the same as the first embodiment, only parts which are different in the present embodiment are described.

Figure 7:
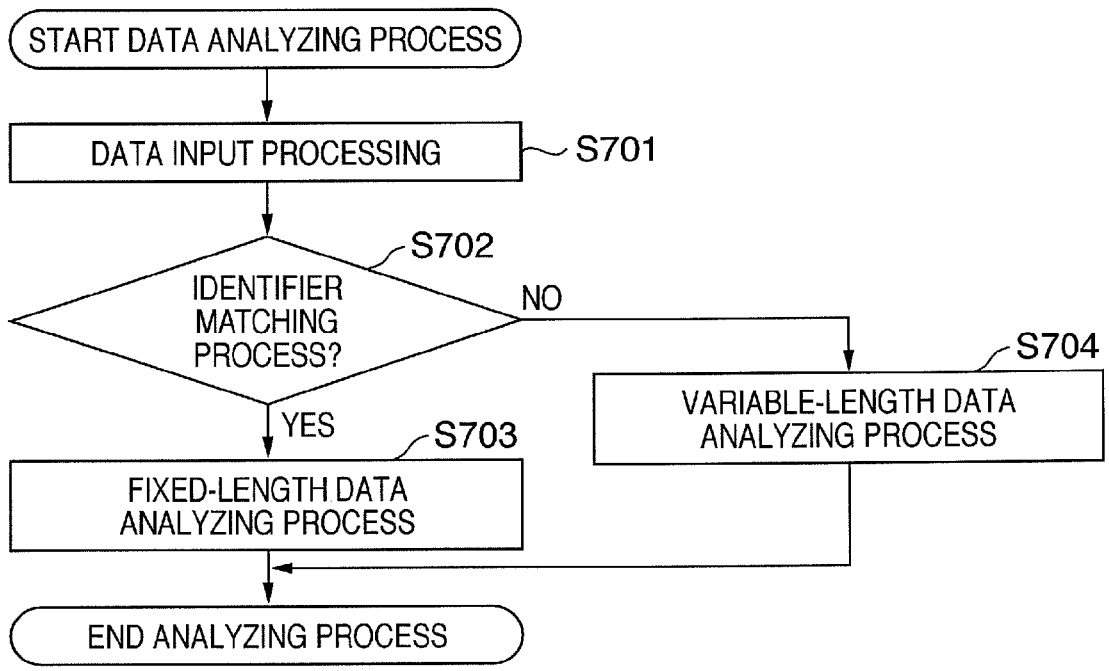
FIG. 7 is a flow-chart showing a flow of a data analysis process executed by a data analyzing unit.

Processes executed in the data analyzing unit 406 of FIG. 4 are described below with reference to FIG. 7. FIG. 7 is a flow-chart showing a flow of a data analysis process executed by the data analyzing unit 406.

First, in step S701, the data analyzing unit 406 inputs the identifier I405, then in step S702, performs a matching process with an allowable identifier list, in other words, judging whether or not the input identifier I405 exists in the identifier list stored in the identifier storing unit 408. If the identifier I405 exists in the identifier list (YES at step S702), the process moves to step S703; if not (NO at step S702), then the process moves to step S704. In step S703, as in step S503 of FIG. 5, the variable-length data is analyzed as fixed-length data having the format corresponding to the input identifier I405. On the other hand, in step S704 the variable-length data is analyzed as ordinary variable-length data, since it could not be analyzed as fixed-length data.

A supplemental description is given of a method for avoiding mistaken detection of the identifier I. One method for avoiding mistaken detection is a method for making the identifier long enough to sufficiently reduce the probability of mistaken detection. For example, the probability of mistaken detection when the identifier is 4 bytes long is $(\frac{1}{2})^{32}$. Additionally, there is a method of making the identifier a stored data group {D_i} or a data type, or alternately, a byte string which cannot exist as data acquirable by the identifier storing unit. For example, if the stored data group is expressed as ASCII code, for example, it is possible to prevent mistaken detection by making the identifier 0xFFFFFFFF.

As described above, the variable-length data analyzing device of the present embodiment is constituted so as to analyze the input data M402 as ordinary variable-length data if the identifier I cannot be detected from the data. If the identifier I is detected, the data can be analyzed rapidly as fixed-length data.

Furthermore, in the constitution according to the present embodiment, the occurrence of interruptions of the analyzing process or of problems in the analysis results can be suppressed by embedding an identifier in order to prevent mistaken detection or situations in which processing is impossible during data analysis. If the extracted identifier I is inappropriate, detecting and processing it can prevent mistaken operation even if the identifier I is not extracted correctly.

Third Embodiment

Next is described an example of a case in which the present embodiment according the present invention is applied to public key certificates as data to be analyzed, in particular X.509 public key certificates. X.509 public key certificates are DER encoded variable-length binary data, and are therefore easily applicable to the present embodiment according to the present invention. Further, as the present embodiment is mostly the same as the first embodiment, only parts which are different in the present embodiment are described.

Figure 11:
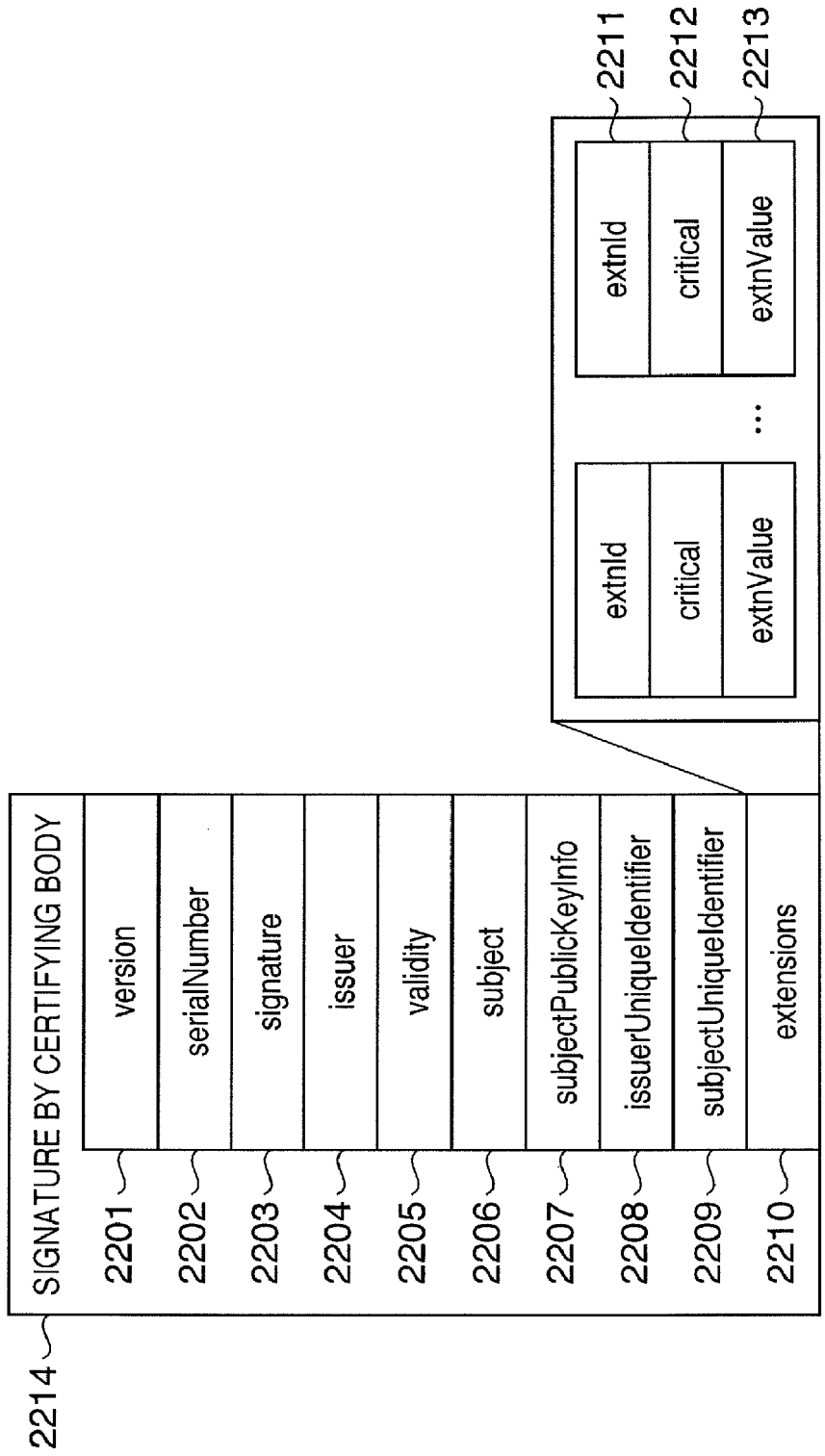
FIG. 11 is a view showing a typical format of a public key certificate defined in X.509 v.3.

X.509 public key certificates are provided with areas in which application or system-dependent data, called X509v3 extensions, can be stored (extension 2210 in FIG. 11). The identifier I can therefore be stored in the v3 extension area. Moreover, for the variable-length data analyzing device to analyze data as fixed-length data, it is necessary to reference the v3 extension area, and the variable-length data analyzing device can easily reference the identifier I by expressing areas other than the extension 2210 in FIG. 11 with a fixed length.

Below is given an example of generation of specific X.509 public key certificates with reference to FIG. 2 and FIG. 3. The data group {D_i} 202, which is the input of the variable-length data generating device 201 is equivalent to the information below given in FIG. 11.

version2201.
serialNumber2202.
signature2203.
issuer2204.
validity2205.
subject2206.
subjectPublicKeyInfo2207.
issuerUniqueIdentifier2208.
subjectUniqueIdentifier2209.

In step S301, the variable-length data generating device inputs these variable-length data. Next, in step S302, a process for appending the data group {D_i} to the variable-length data is performed on the identifier I205 corresponding to the input variable-length data. In step S303, variable-length data M is generated from the data group {D_i} and the identifier I205 using the DER encoding defined in X.509. In other words, an identifier I205 corresponding to the format agreed upon with the variable-length data analyzing device ahead of time in step S302 is appended to a location equivalent to extensions 2210 in FIG. 11, and DER encoding is performed in step S303. In step S304, the offset information is acquired, and in step S305 M is output in a format according to the DER encoding defined in X.509 as the overall output result. Here, an example of generating an X.509 public key certificate is given as a specific case, but the generating process and constitution are the same as in the first embodiment.

Upon receiving the variable-length data M, the variable-length data analyzing device extracts the identifier I205 and analyzes the variable-length data M using the same procedure as in the first embodiment, i.e., the process for fixed-length data, based on the format corresponding to the extracted identifier I205.

As described above, with the constitution of the present embodiment, data such as X.509 public key certificates can be analyzed as fixed-length data. Therefore, X.509 public key certificates can be analyzed without parsing variable-length data. Thus, according to the present embodiment, a technology can be provided which is capable of easily connecting with the certification infrastructure already widespread on the internet and of verifying public key certificates without parsing variable-length data.

Fourth Embodiment

In the third embodiment, the X.509 public key certificate is generated so that areas other than extensions are expressed as fixed-lengths. However, the data constituting X.509 public key certificates is not just information in which bit length is maintained constant regardless of the computation result, such as issue or subject. For example, there exists information whose bit length varies with the computation result, such as the signature 2214 to the public key certificate by a certification authority. When the bit length of the data constituting the data group {D_i} varies thus, the types of formats of variable-length data generated based on this kind of data grow in number. For this reason, the identifier storing units 204 and 408 need to store a large volume of information.

In the present embodiment, a configuration is described in which it is possible to reduce the volume of information stored in the identifier storing units 204 and 408 by generating variable-length data conforming to prescribed formats. Further, as the present embodiment is mostly the same as the first embodiment, only parts which are different in the present embodiment are described.

Figure 8:
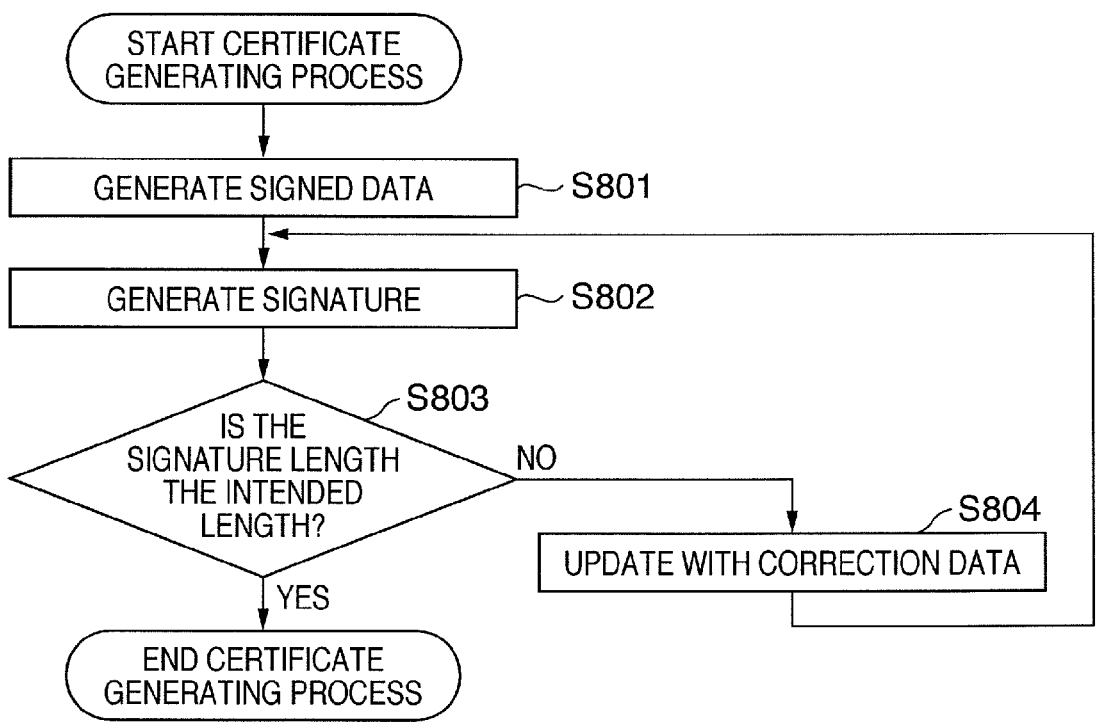
FIG. 8 is a flow-chart showing a flow of a certificate generating process executed by a variable-length data generating device.

FIG. 8 is a flow-chart showing a flow of a certificate generating process executed by a variable-length data generating device. Below, digital signature data is described as an example of information whose bit length varies depending on the computation result, but the method described in the present embodiment may be applied to other types of data.

First, signed data is generated in step S801. However, this signed data includes areas for correction data described below, and stores an initial value (e.g., 0x0000). The generation of signed data is done, for example, by acquiring the data to be signed from the storage device and adding the area for correction data.

Next, the signature is generated in step S802. A publicly known method may be applied to the process for generating the signature.

Next, in step S803, it is determined whether or not the data length of the signature data generated in step S802 is the intended length, that is, a length conforming to any format information stored in the identifier storing unit 204. This judgment process can be done, for example, by preparing a fixed-length data area for storing signature data which conforms to the format information, and if the most significant byte is 0, judging that the data is not the intended length, and if other than 0, judging that it is the intended length. Upon the judgment of step S803, if the length is the intended length (YES at step S803), the process is ended, the signature data is combined with the signed data, and the public key certificate is output. If the length is not the intended length (NO at step S803), then the process moves to step S804.

At step S804, the correction data described above is updated to different data (for example by adding 1), and the signature process is done again in step S802. The signature data thus created can be verified like an ordinary signature, and therefore there is no need to include special mechanisms in the analyzing device for verifying the signature.

In X.509 public key certificates, extension 2210 can be used as an area for correction. Specifically, it is possible to store the identifier I and the correction data together in the X.509v3 extensions, for example, storing the identifier in extnId 2211 and the correction data in extnValue 2213.

As described above, in the present embodiment, a trial-and-error type of signature generating process is performed in which the correction data is updated until the signature length reaches the intended length. In this way, signature data having the desired data length can be created, making it possible as a result to reduce the information volume stored in the identifier storing units 204 and 408.

A configuration for making signature data a fixed length has been described, but a similar method can be used to acquire data having a desired bit length for other types of information. As an example of this, an arrangement for making public key data included in public key certificates a fixed length is described with reference to FIG. 9.

Figure 9:
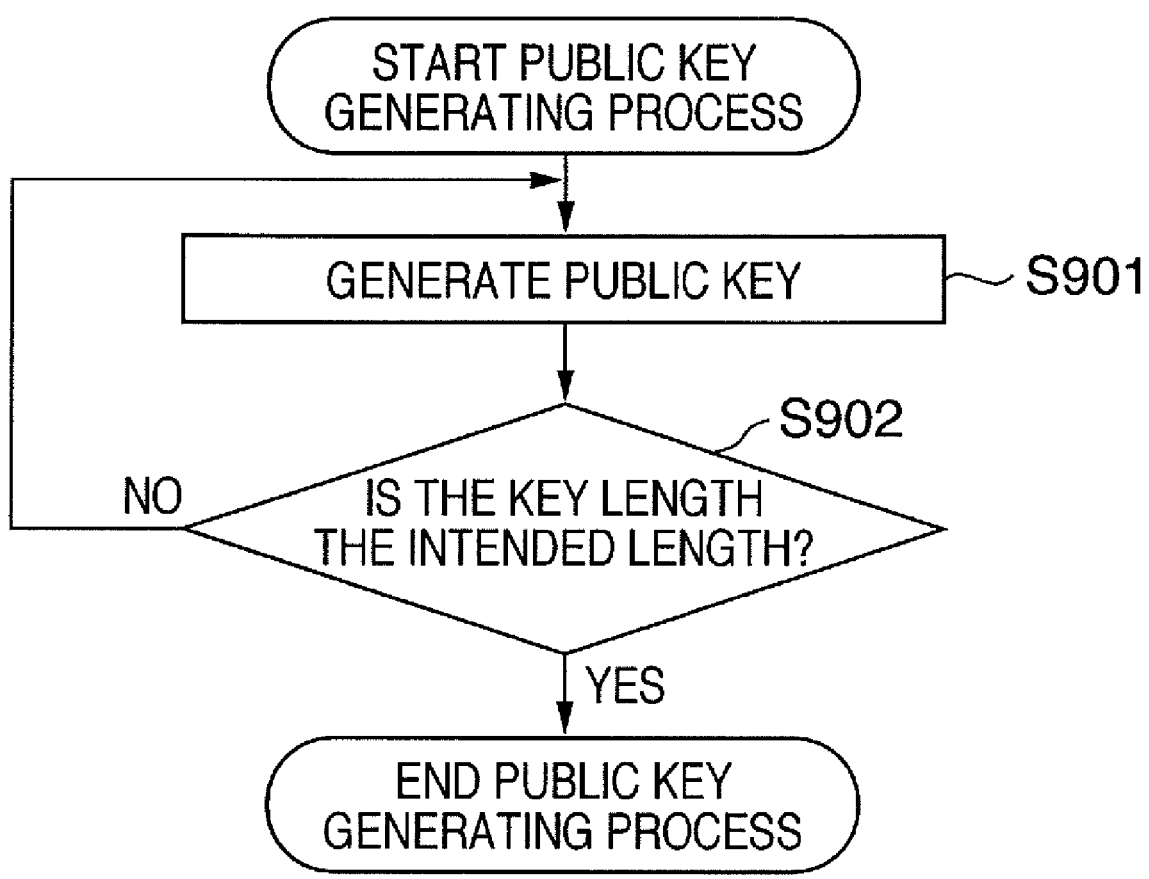
FIG. 9 is a flowchart showing a flow of a process for generating a public key with a prescribed length.
Figure 10:
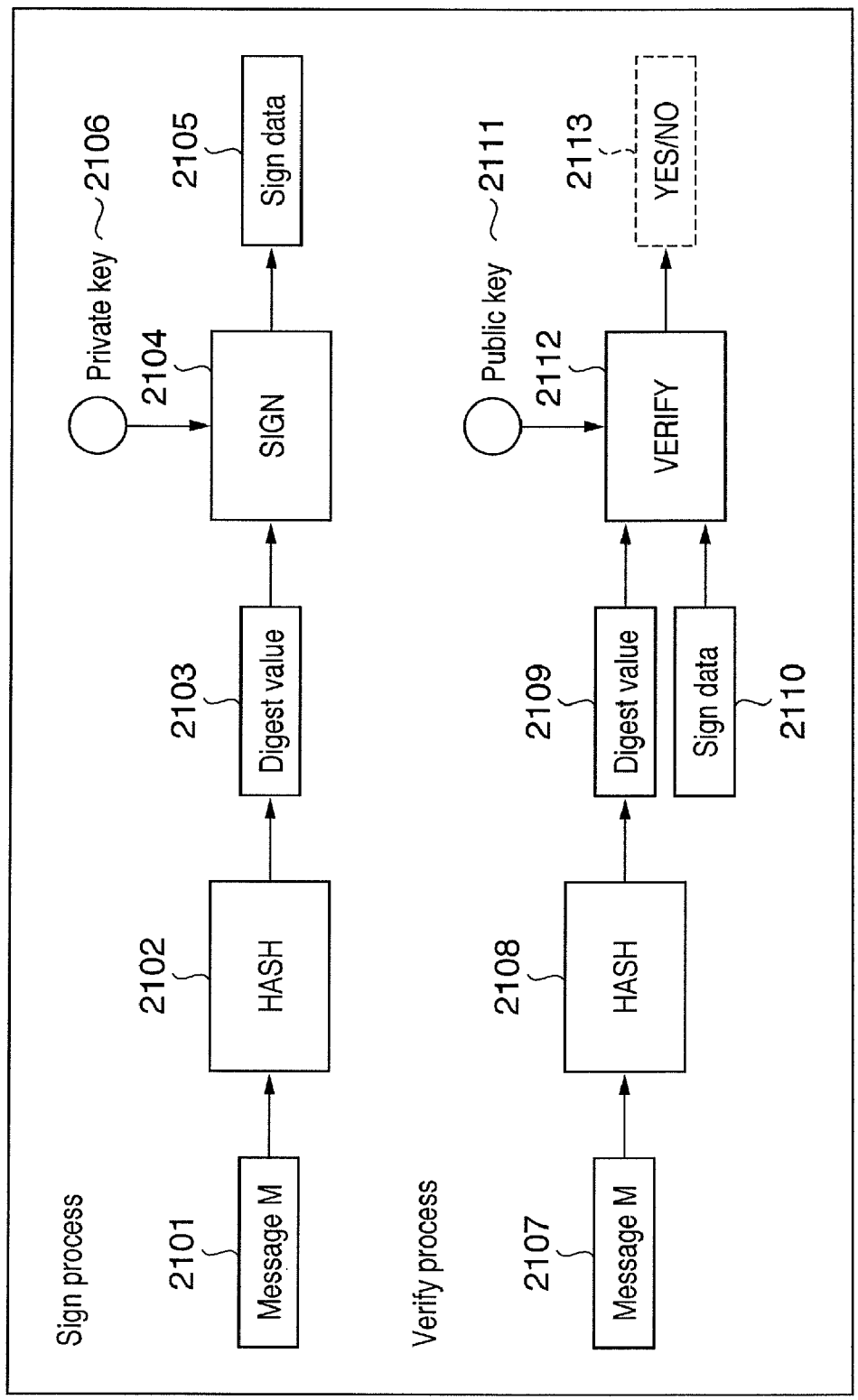
FIG. 10 is a schematic diagram showing a signature creation process and a signature verification process.

FIG. 9 is a flowchart showing a flow of a process for generating a public key with a prescribed length. In step S901, key generation is performed, and in step S902 it is checked whether or not the data length of the public key data which is the result thereof is the intended length. If it is the intended length (YES at step S902), the process is ended, and the key data is output. If as a result of the check in step S902, the data is not the intended length (NO at step S902), the key is regenerated in step S901. By performing this kind of trial-and-error key generation process, it is possible to create key data having the desired data length.

In the above, an example is described for acquiring data of a desired length when generating a public key certificate, but the process for acquiring data of a desired length can also be executed for cases in which other data is generated. Performing this process also makes it possible to reduce the information volume stored in identifier storing units 204 and 408. It is also possible to reduce the information volume stored in identifier storing units 204 and 408 by performing this process.

In the above, an example is described for acquiring data of a desired length for one of the data group {D_i}, but it is also possible to acquire data of the desired length for two or more instances of data.

If there exist two or more formats of variable-length data which can be generated, then an arrangement is possible such that data corresponding to one of these formats is acquired. For example, the following process can be performed. Consider a situation in which the data group {D_i} is made up of data $d_1$, $d_2$, and $d_3$. In this case, for example, first data $d_1$ is generated, and a format is extracted which conforms with the generated data $d_1$. If no conforming format exists, generation of data $d_1$ is repeated until a conforming format is extracted. Next, data $d_2$ is generated, and a format conforming to the generated data $d_2$ is extracted from the first extracted format. If no conforming format exists, generation of data $d_2$ is repeated until a conforming format is extracted. Next, a similar generation process is performed for data $d_3$. Then the variable-length data generating process is executed so as to append to the variable-length data an identifier corresponding to a format conforming to the generated data $d_1$, $d_2$, or $d_3$. With this arrangement, if there exist two or more formats of variable-length data which can be generated, then it is possible to acquire data corresponding to one of these formats.

Other Embodiments

In the verification process for ordinary X.509 public key certificates, the process is performed treating upper case and lower case characters of the same letter as the same text, as with electronic mail addresses. Computational cost is therefore required, since the judgment of the identity of the character string cannot be done by simply comparing bits. In contrast, by performing verification based on simple comparison of byte strings, treating upper and lower case characters of the same letter as different text, computational cost due to verification can be further reduced.

Furthermore, as a signature method of public key certificates, an encryption process (confidence) method using a public key encryption method including an RSA signature can be applied, as well as an encryption process method using a common key encryption method, and a MAC (message authentication code) generating method. In other words, the constitution according to the present embodiment described above can be applied using other encryption algorithms.

The embodiments of the present invention have been described, but the present invention can take an aspect of, for example, a system, a device, a method, a program, or a storage medium, etc. For example, the present invention may be applied as part of a system constituted by a plurality of devices (e.g., a host computer, an interface device, a reader, a printer, etc.), or applied as part of a single device (e.g., a copier, a facsimile device).

Furthermore, the embodiments according to the present invention are not limited by the elements making up the above devices or combinations of the devices. For example, this includes cases in which the present invention is achieved by supplying either directly or remotely a program for realizing the functionality of the embodiments described above to a system or device, and the computer of the system or the device reading and executing the supplied program code. Accordingly, the program code installed on a computer in order to realize the functions and processes of the present invention on a computer itself is included in the technical scope of the present invention. In other words, the present invention includes any computer programs for realizing the functions and processes of the present invention.

In this case, the program code itself realizes the functions of the embodiments. Therefore, the program code itself and any units for supplying the program code to the computer, or specifically the storage media storing the program code are included in the technical scope of the present invention.

As storage media for storing this kind of program code, for example, floppy disks, hard disks, optical disks, magneto-optical disks, CD-ROMs, magnetic tape, non-volatile memory cards, ROMs, etc., can be used.

The present invention is not limited to realizations of the functions of the above embodiments by controlling the devices in accordance only with program code. For example, if the embodiments are realized by the program code together with an OS (operating system) running on a computer or with other application software, etc., then that program code is included in the technical scope of the present invention.

Furthermore, the functions of the embodiments described above are also realized by program commands after the program read from a storage medium is written to memory provided to a function enhancing board inserted into a computer or a function enhancing unit connected to a computer. In other words, the functions of the embodiments described above are also realized by the CPU, etc., provided to the function enhancing board or function enhancing unit performing all or part of the actual processes.

As described above, with the present invention, it is possible to provide a technology for making low computational cost analysis possible of variable-length data described using existing variable-length data formats.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-115013, filed Apr. 18, 2006 and 2007-062483, filed Mar. 12, 2007, which are hereby incorporated by reference herein in their entirety.

What is claimed is:

1. A data generating device comprising:
a variable-length data input unit adapted to input variable-length data;
an embedding unit adapted to embed identification data corresponding to format information indicating the format of the variable-length data to the variable-length data;
an location information acquiring unit adapted to acquire location information showing locations corresponding to identification data in variable-length data;

an outputting unit adapted to output the variable-length data in which the identification data is embedded and the location information, wherein the variable-length data comprises a public key certificate; and a data generating unit adapted to generate with a pre-determined length at least one set of data to be input by the variable-length data input unit, wherein the data generating unit calculates signature data based on signed data and corrected data and, if the bit length of the signature data is not the pre-determined length, generates signature data by repeating the calculation until signature data with the pre-determined length is obtained.

2. The data generating according to claim 1, further comprising:

a storage unit adapted to store in association identification data and format information indicating a format of variable-length data.

3. The data generating according to claim 1, in which the variable length data includes at least one of a hash value for data to be certified and signature data.

4. The data generating according to claim 1, in which the public key certificate is an X.509 public key certificate, and the identification data is stored in an extension of the X.509 public key certificate.

5. A control method for a data generating device comprising:

a variable-length data input step of inputting variable-length data;

an embedding step of embedding identification data corresponding to format information indicating a format of the input variable-length data to the variable-length data;

an location information acquiring step of acquiring location information indicating locations corresponding to the identification data in the variable-length data;

an outputting step of outputting the variable-length data in which the identification data is embedded and the location information, wherein the variable-length data comprises information constituting a public key certificate; and a data generating step of generating with a pre-determined length at least one set of data to be input by the variable-length data input step, wherein the data generating step calculates signature data based on signed data and corrected data and, if a bit length of the signature data is not the pre-determined length, generates signature data by repeating the calculation until signature data with the pre-determined length is obtained.

6. A non-transitory machine-readable storage medium which stores a program that when loaded into a data processing device and executed causes the data processing device to perform a method as according to claim 5.

7. A data processing system having:

a data generating device comprising:

a variable-length data input unit adapted to input variable-length data, an embedding unit adapted to embed identification data corresponding to format information indicating a format of the variable-length data to the variable-length data, an location information acquiring unit adapted to acquire location information showing locations corresponding to identification data in variable-length data in which the identification data has been embedded, an outputting unit adapted to output the variable-length data in which the identification data is embedded and the location information, and a data generating unit adapted to generate with a pre-determined length at least one set of data to be input by the variable-length data input unit, wherein the data generating unit calculates signature data based on signed data and corrected data and, if the bit length of the signature data is not the pre-determined length, generates signature data by repeating the calculation until signature data with the pre-determined length is obtained; and a data analyzing device comprising:

an acquisition unit adapted to acquire as data to be analyzed variable-length data in which is embedded the identification data, a storage unit adapted to store in association identification data and format information indicating a format of data, a detection unit adapted to detect the identification data in the data to be analyzed, an analysis unit adapted to analyze the data to be analyzed based on the format information associated with the identification data.

* * * * *